(12) United States Patent
Hasegawa et al.

(10) Patent No.: US 11,140,821 B2
(45) Date of Patent: Oct. 12, 2021

(54) APPARATUS AND METHOD FOR COOLING LAWNMOWER COMPONENTS

(71) Applicant: Honda Motor Co., Ltd., Tokyo (JP)

(72) Inventors: Toshiyuki Hasegawa, Durham, NC (US); Shivang Desai, Carrboro, NC (US); Robert A. Recher, Mebane, NC (US); Christopher Todd Walker, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 481 days.

(21) Appl. No.: 16/353,125

(22) Filed: Mar. 14, 2019

(65) Prior Publication Data
US 2020/0288634 A1    Sep. 17, 2020

(51) Int. Cl.
*A01D 34/81* (2006.01)
*A01D 34/78* (2006.01)
*A01D 101/00* (2006.01)

(52) U.S. Cl.
CPC ............. *A01D 34/81* (2013.01); *A01D 34/78* (2013.01); *A01D 2101/00* (2013.01)

(58) Field of Classification Search
CPC ...... A01D 34/81; A01D 34/78; A01D 34/695; A01D 34/077; A01D 34/0775; A01D 34/001; A01D 69/02; A01D 69/2101
See application file for complete search history.

(56) References Cited

U.S. PATENT DOCUMENTS

| | | | | |
|---|---|---|---|---|
| 5,317,860 | A | * | 6/1994 | Dunn ................. A01D 43/0775 56/12.8 |
| 5,819,513 | A | * | 10/1998 | Braun .................... A01D 34/82 56/11.9 |
| 6,666,008 | B2 | | 12/2003 | Iida et al. |
| 6,826,895 | B2 | | 12/2004 | Iida et al. |
| 7,540,132 | B2 | | 6/2009 | Shimada et al. |
| 8,191,343 | B1 | * | 6/2012 | Hauser ................... A01D 34/78 56/11.9 |
| 8,653,786 | B2 | | 2/2014 | Baetica et al. |
| 9,093,868 | B2 | | 7/2015 | Baxter |
| 2018/0146620 | A1 | | 5/2018 | Uchimi et al. |
| 2018/0151854 | A1 | | 5/2018 | Kubota et al. |
| 2020/0196522 | A1 | * | 6/2020 | Feng ...................... A01D 34/64 |
| 2020/0383266 | A1 | * | 12/2020 | Nishimura ............... H02K 5/20 |

FOREIGN PATENT DOCUMENTS

| | | |
|---|---|---|
| EP | 2875712 A1 | 5/2015 |
| JP | 6283548 B2 | 2/2018 |
| JP | 2018-85970 A | 6/2018 |

* cited by examiner

*Primary Examiner* — Alicia Torres
(74) *Attorney, Agent, or Firm* — Kenealy Vaidya LLP

(57) ABSTRACT

A lawnmower and lawnmower cooling system can include a housing configured to contain a motor, a battery assembly, a motor driver, and a controller. The housing can include at least one air inlet located adjacent to the top surface of the deck. The housing can include a driver chamber, a battery chamber, a motor chamber, and at least one air outlet. A fan can be mounted in the housing such that, when the fan operates, air enters the air inlet, flows through the driver chamber away from the top surface of the deck along the upward direction, passes through the motor driver along the upward direction, passes into the battery chamber and flows through the battery pack, passes into the motor chamber and flows through the electric motor, and exits the motor chamber through the at least one air outlet.

20 Claims, 7 Drawing Sheets

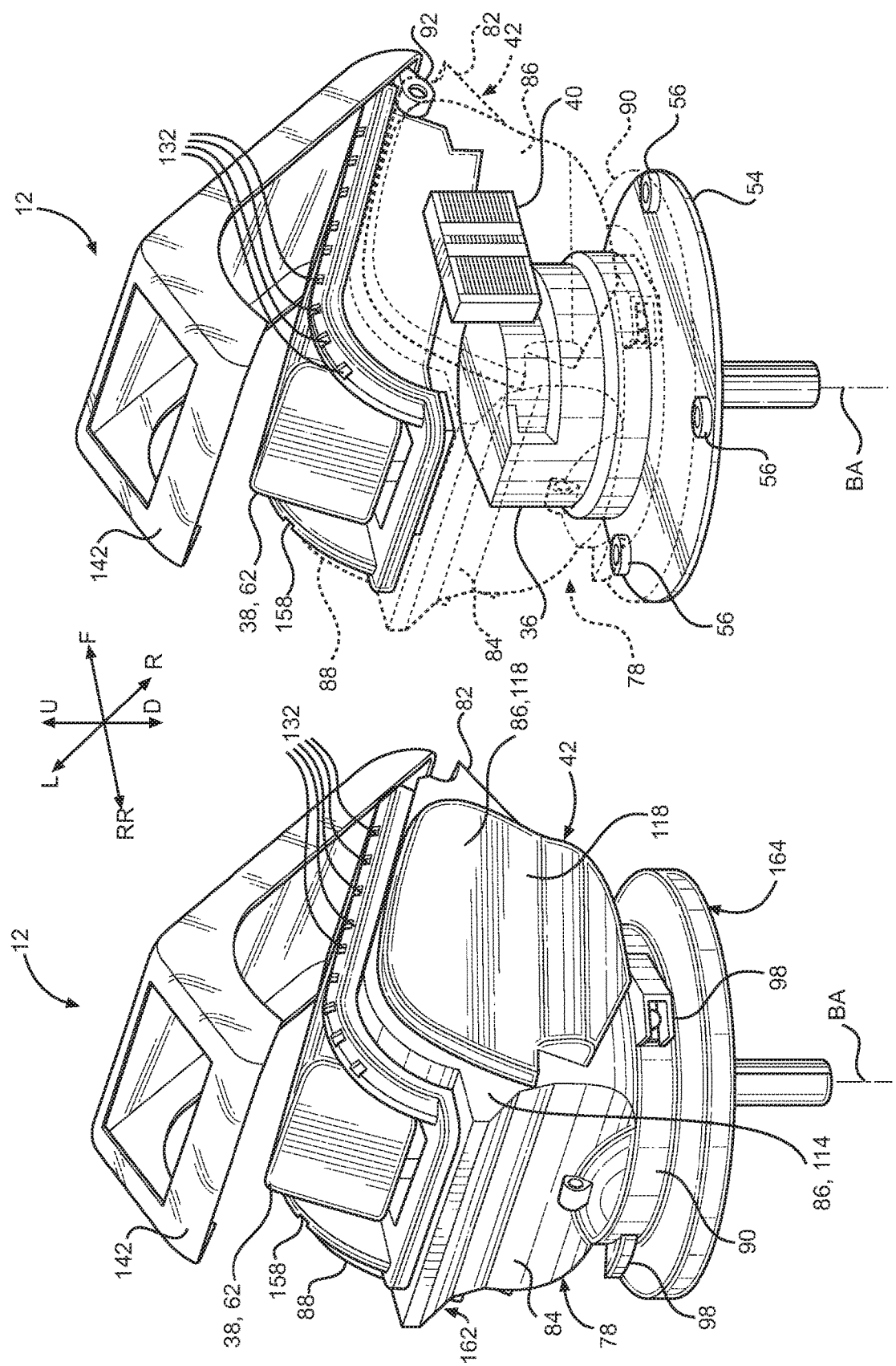

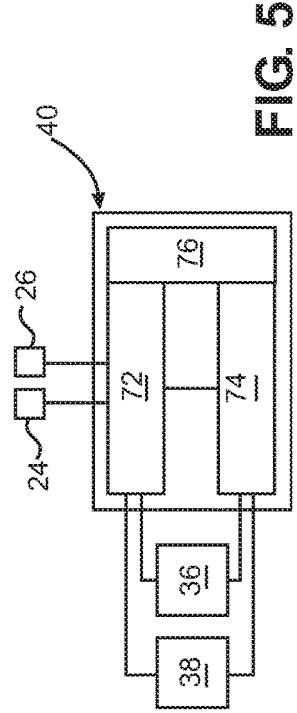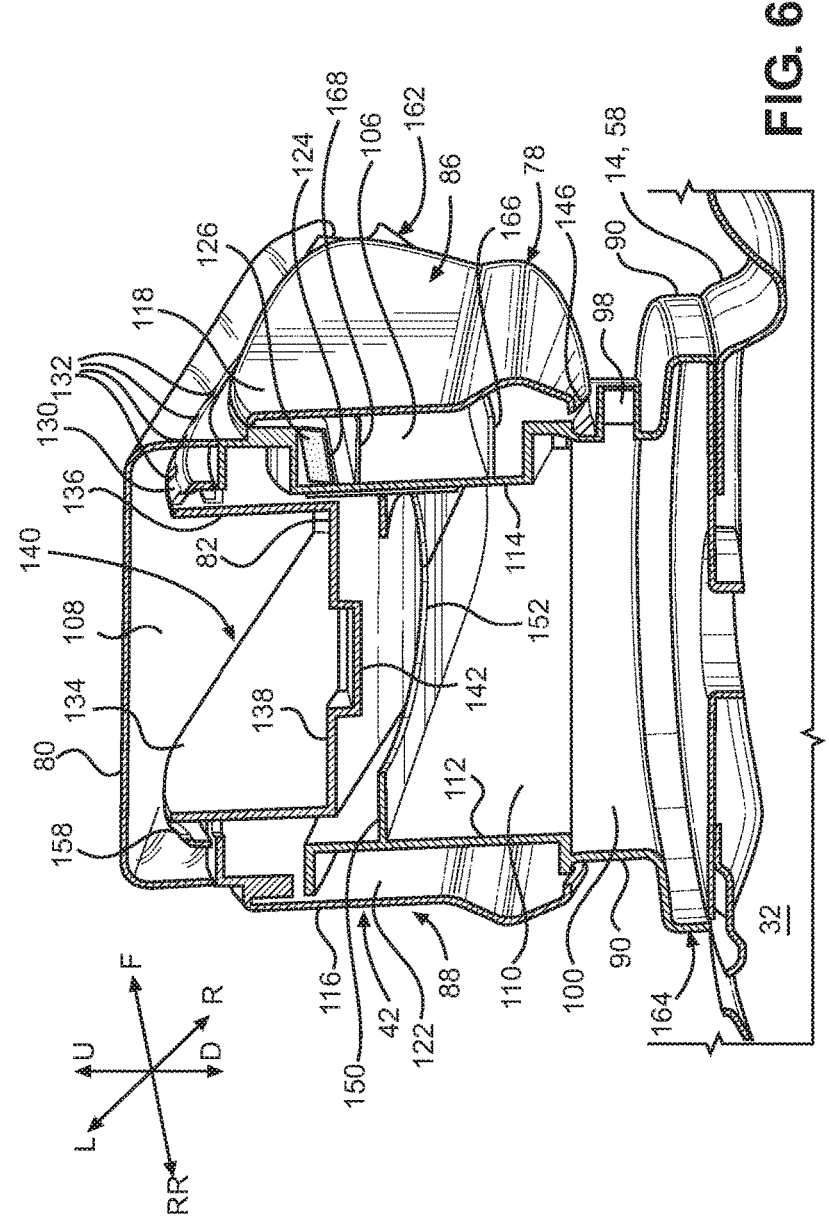

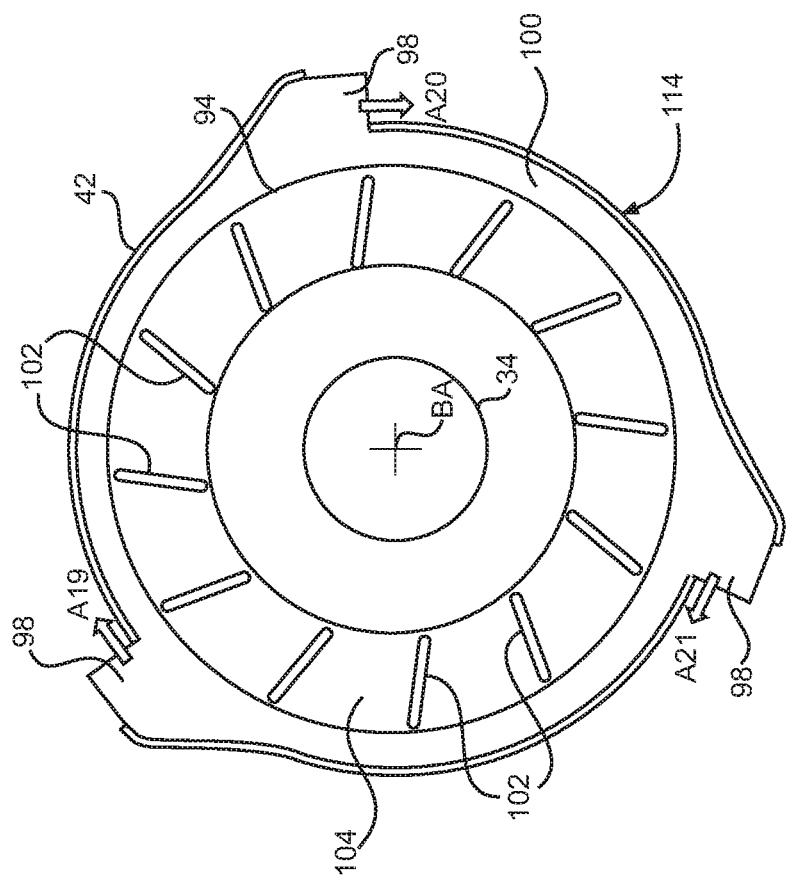
FIG. 7
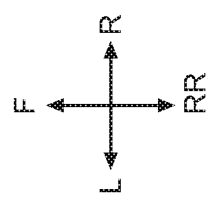

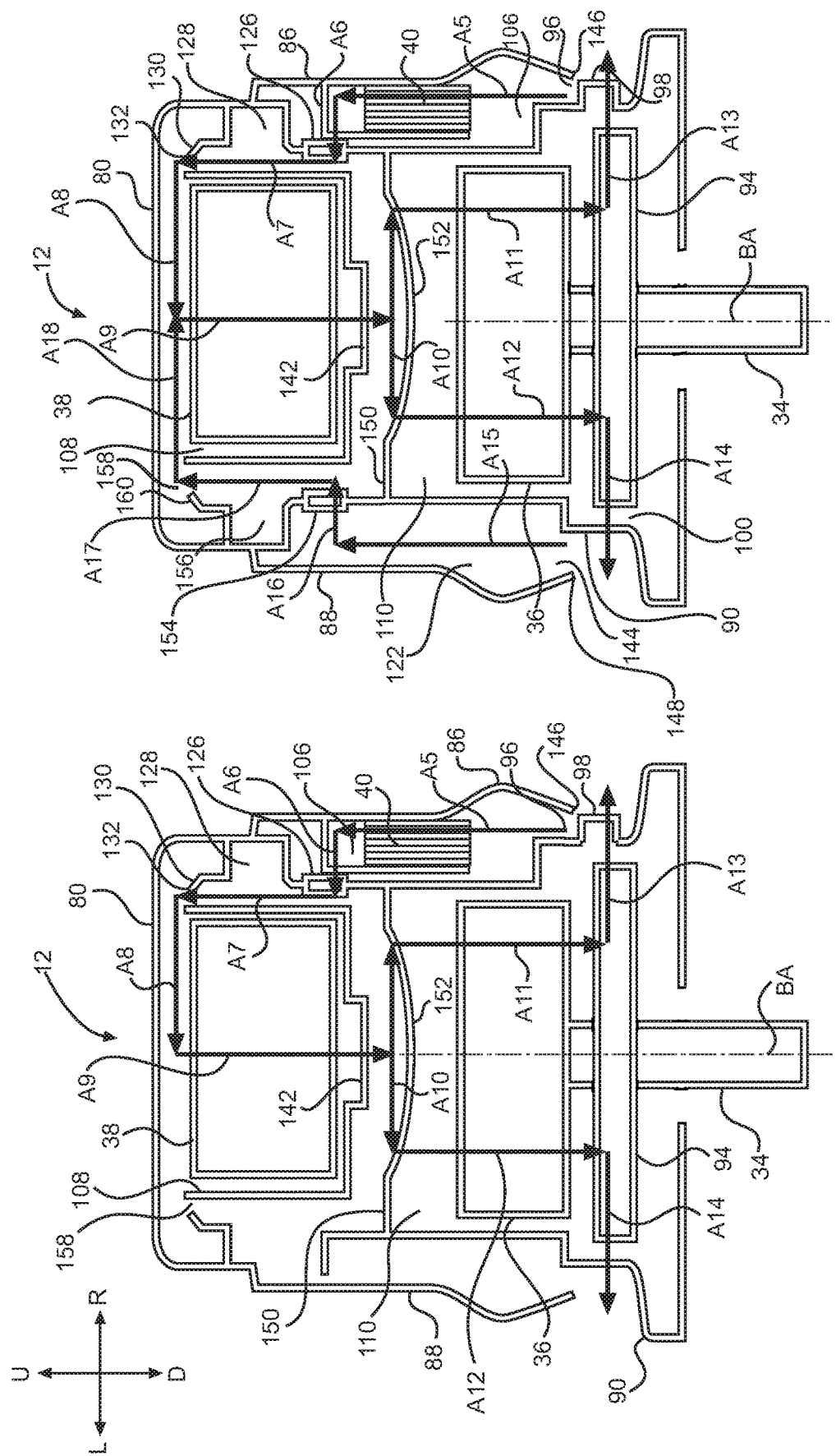

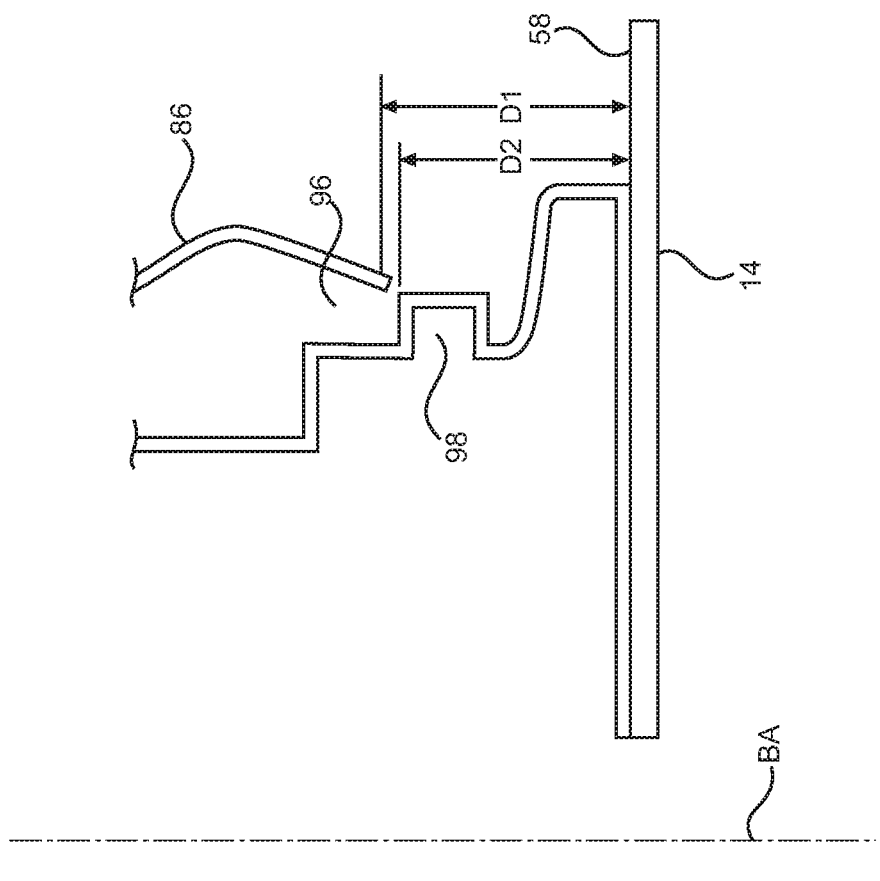
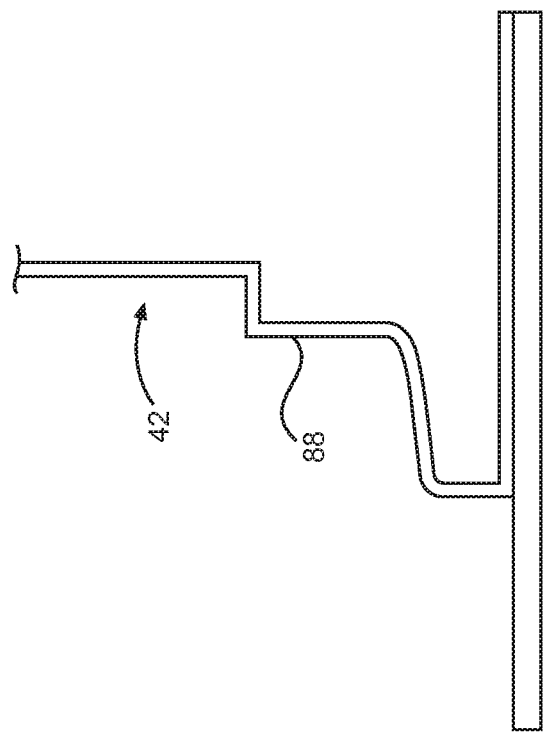
FIG. 10

APPARATUS AND METHOD FOR COOLING LAWNMOWER COMPONENTS

BACKGROUND

The disclosed subject matter relates to a lawnmower. More particularly, the disclosed subject matter relates to methods and apparatus that can shield the motor, electrical components and other components of the lawnmower from undesirable substance(s) and transfer heat generated by the motor and electronic components to the ambient environment.

Lawnmowers can be powered by an internal combustion engine or by an electric motor. The internal combustion engine or electric motor can be connected to one or more blades to rotate the blade(s) inside of a cutting chamber. Electric lawnmowers can rely on an external power source such as a wall outlet and can be connected to the wall outlet by an electrical cable (also referred to as an extension cord). Alternatively, electric lawnmowers can include an internal power supply such as a battery pack that includes one or more battery cells.

SUMMARY

Some embodiments are directed to a cooling system for a power source assembly for a lawnmower, where the lawnmower has a deck defining a cutting chamber and a blade mounted in the cutting chamber to rotate about a blade axis. The power source assembly can include a motor mounted on a top surface of the deck and be configured to rotate the blade in the cutting chamber. The lawnmower can include a battery pack and a motor driver in electrical communication with each of the motor and the battery pack. The motor driver can convert power from the battery pack into output power supplied to the motor. The cooling system can include a housing configured to contain the motor, the battery assembly, and the controller. The housing can include a bottom end configured to be mounted on the top surface of the deck, a top end configured to be spaced away from the top surface of the deck along an upward direction, at least one air inlet located adjacent to the top surface of the deck, a driver chamber in fluid communication with the air inlet and configured to support the motor driver, a battery chamber in fluid communication with the driver chamber and configured to support the battery pack. The housing can also include a motor chamber in fluid communication with the battery chamber and configured to contain the motor therein, and at least one air outlet in fluid communication with the motor chamber. A fan can be mounted in the housing such that, when the fan operates, air enters the air inlet, then the air flows through the driver chamber away from the top surface of the deck along the upward direction, then the air passes through the motor driver along the upward direction, then the air passes into the battery chamber and flows through the battery pack along a downward direction that is toward the top surface of the deck, then the air passes into the motor chamber and flows through the electric motor along the downward direction, and the air that exits the motor chamber passes through the at least one air outlet.

In accordance with another embodiment of the disclosed subject matter, a lawnmower can include a deck having a top surface and a cutting chamber. A plurality of wheels can be rotatably supported on the deck, and a drive shaft can pass through the top surface of the deck and into the cutting chamber. A blade can be located in the cutting chamber and connected to the drive shaft. A motor mounted on a top surface of the deck can be connected to the drive shaft, with the motor configured to rotate the blade in the cutting chamber. The lawnmower can include a battery pack, and a motor driver in electrical communication with each of the motor and the battery pack. The motor driver can be configured to convert power from the battery pack into output power, and to supply the output power to the motor. A housing can be configured to contain the motor, the battery pack and the motor driver. The housing can include a bottom end adjacent the top surface of the deck, a top end spaced away from the top surface of the deck along an upward direction, at least one air inlet located adjacent to the top surface of the deck. A driver chamber can be in fluid communication with the air inlet, and the motor driver located in the driver chamber. A battery chamber can be in fluid communication with the controller chamber, the battery pack located in the battery chamber. A motor chamber can be in fluid communication with the battery chamber, the motor located in the motor chamber, and at least one air outlet can be in fluid communication with the motor chamber. A fan can be mounted in the housing and configured such that during operation air enters the air inlet, then the air flows through the driver chamber away from the top surface of the deck along the upward direction, then the air passes through the motor driver along the upward direction, then the air passes into the battery chamber and flows through the battery pack along a downward direction that is toward the top surface of the deck, then the air passes into the motor chamber and flows through the electric motor along the downward direction, and then the air exits the motor chamber passing through the at least one air outlet.

According to yet another aspect of the discloses subject matter, a method for cooling electrical components of a lawnmower is provided. The lawnmower can include a deck, a blade rotatably mounted in a cutting chamber of the deck, a motor, a battery pack, a motor driver in electrical communication with the motor and the battery pack, and a housing that contains the motor driver, the battery pack, and the motor, where the motor driver is configured to convert power from the battery pack into output power and to supply the output power to the motor. The method can include causing air to enter the housing at a location that is adjacent to a top surface of the deck, directing the air entering the housing to flow through a driver chamber in the housing that is spaced away from the top surface of the deck along an upward direction such that the air in the driver chamber flows through the motor driver along the upward direction. The method can also include directing air exiting the driver chamber to flow through a battery chamber in the housing such that the air in the battery chamber flows through the battery pack toward the top surface of the deck in a downward direction, directing air exiting the battery chamber to flow through a motor chamber in the housing such that air in the motor chamber flows through the motor in the downward direction, and directing air exiting the motor chamber to exit the housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is a perspective view of the power assembly of the lawnmower of FIG. 1.

FIG. 4 is a perspective view of the power assembly for the lawnmower of FIG. 1 with the housing shown in phantom and showing internal components of the power source assembly.

FIG. 5 is a schematic view of an electrical circuit of the power source assembly of the lawnmower of FIG. 1.

FIG. 6 is a perspective view of a portion of the lawnmower of FIG. 1 showing the housing in cross-section and a portion of the deck in cross-section. The electric motor, battery pack and motor driver are omitted for clarity of the drawing figure.

FIG. 7 is a cross-sectional view of a lower of the power source assembly of FIGS. 4 and 5 showing a base of the housing, a fan, and air outlets.

FIG. 8 is a cross-sectional view of the power source assembly of FIGS. 4 and 5 and schematically illustrates the electric motor, battery pack, fan and a first exemplary predetermined airflow path in accordance with the disclosed subject matter.

FIG. 9 is a cross-sectional view of an alternate embodiment of a power source assembly of FIGS. 4 and 5 and schematically illustrates the electric motor, battery pack, fan and a second exemplary predetermined airflow path in accordance with the disclosed subject matter.

FIG. 10 is a schematic view of the housing of the power source assembly of FIGS. 3 and 4 that depicts a spatial relationship between an exemplary air inlet and an exemplary air outlet.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Electric lawnmowers can include electrical components, which can be adversely affected by dust, debris and liquids. Electric lawnmowers can include a protective housing that encloses the electrical components and is configured to shield the electrical motor and electronic components from dust, debris and liquids. However, during operation of the electric lawnmower, the electrical motor and electronic components can generate heat. This generated heat can also adversely affect the electrical motor and/or the electronic components if the generated heat is not transferred to the ambient environment. Thus, the protective housing should have a relatively high heat conductivity if the housing seals the electrical motor and electronic components from the ambient environment.

However, a sealed housing that also provides sufficient heat conduction to transfer heat generated by the electrical motor and electronic components to the ambient environment may be prohibitive due to the cost of the material, the weight and/or the size of the housing.

In contrast, a housing that includes at least one vent that can exhaust some, most or all of the heat generated by the electrical motor and electronic components can permit undesired intrusion of dust, debris and/or liquids into the housing.

Thus, there is a need for an electric lawnmower that can shield the electrical motor and the electronic components from dust, debris and liquids while also providing a cooling system that can advantageously transfer the heat generated by the electrical motor and the electronic components to the ambient environment. There is also a need for an electric lawnmower that can provide an advantageous heat transfer rate that can also draw an advantageously low amount of power from the electric motor and/or battery pack.

Figure 1:
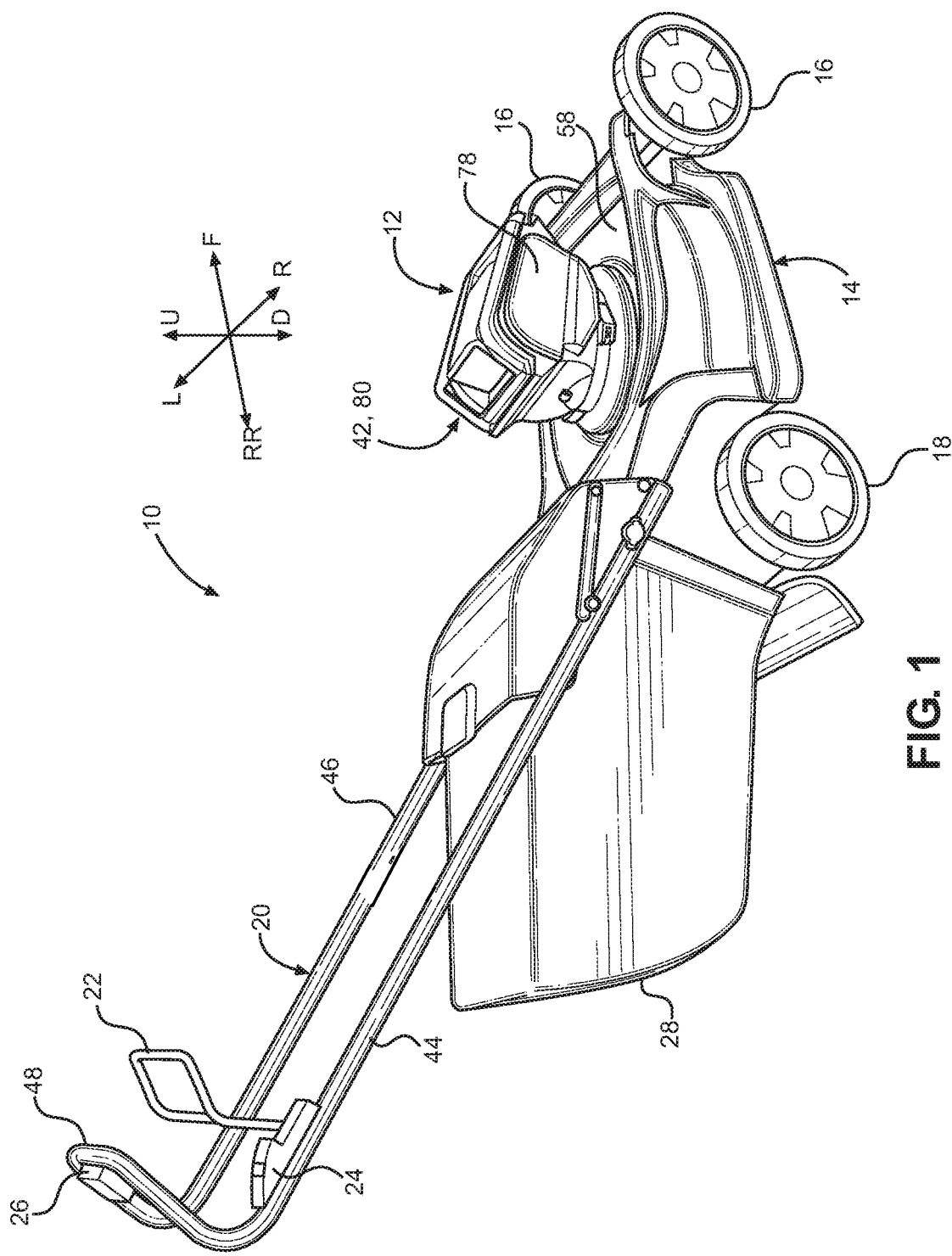
FIG. 1 is a perspective view of a lawnmower made in accordance with principles of the disclosed subject matter.

FIG. 1 is a perspective view of an electric lawnmower 10 made in accordance with principles of the disclosed subject matter. The lawnmower 10 can include a power source assembly 12 that shields the electrical motor and electronic components from an undesirable level of intrusion of dust, debris and liquids. The power source assembly 12 can also be configured to transfer to the ambient environment an advantageous amount of the heat generated by the electrical motor and electronic components such that the temperature of the electrical motor and electronic components can be maintained at or below a predetermined threshold temperature. The power source assembly 12 also can provide an advantageous heat transfer rate that draws a low amount of power to operate a cooling system of the power source assembly 12.

Figure 2:
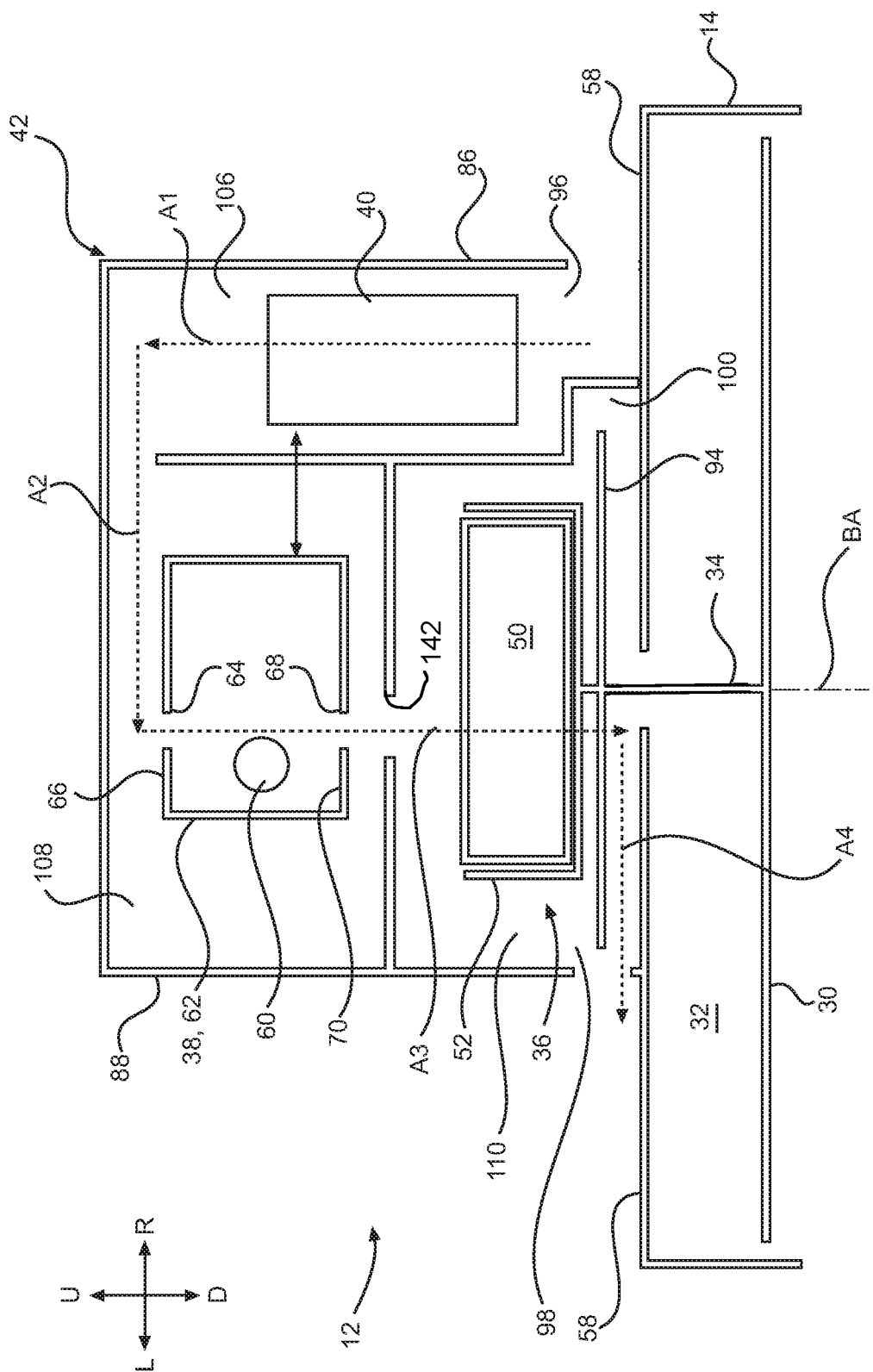
FIG. 2 is a schematic view of the power source assembly, blade and deck of the lawnmower of FIG. 1.

The electric lawnmower 10 can extend in a forward direction F, a rearward direction RR, a leftward direction L, a rightward direction R, a downward direction D and an upward direction U. Referring to FIGS. 2-4, the upward direction U and the downward direction D can be parallel to a blade rotational axis BA and can be opposite directions with respect to each other.

The lawnmower 10 can include a deck 14, a pair of front wheels 6, a pair of rear wheels 18 (the left rear wheel is obstructed from view in FIG. 1 by the deck 14), a handle 20, a blade brake lever 22, a first control assembly 24, a second control assembly 26, and a collection bag 28. The deck 14 can also be referred to as a mower deck or as a cutter deck or as a cutter housing.

Referring to the schematic illustration of FIG. 2, the lawnmower 10 can include a blade 30 mounted in a cutting chamber 32 of the deck 14. A driveshaft 34 can be connected to each of the power source assembly 12 and the blade 30. The power source assembly 12 can be configured to rotate a blade 30 inside the cutting chamber 32. The driveshaft 34 can be referred to as a component of the power source assembly 12. Alternatively, the driveshaft 34 can be referred to as a component that is connected to and driven by the power source assembly 12.

FIGS. 3 and 4 are perspective views of the power source assembly 12 of the lawnmower 10 of FIG. 1. The power source assembly 12 can include an electric motor 36, a battery pack 38, a motor driver 40 and a housing 42. The electric motor 36 and the motor driver 40 are obstructed from view by the housing 42. The housing 42 is shown in phantom in FIG. 4 to reveal the packaging of the electric motor 36 and the motor driver 40 inside the housing 42.

Further features of the electric lawnmower 10 are described with reference to FIG. 1. An operator of the lawnmower 10 can use the handle 20 in order to guide the path of travel of the lawnmower 10. The handle 20 can include a right extension 44, a left extension 46 and a U-shaped portion 48 that connects to and extends from each of the extensions 44, 46. The handle 20 can support the blade brake lever 22 and the control assemblies 24, 26.

The blade brake lever 22 can be pivotally mounted on the handle 18. The blade brake lever 22 can also be configured to selectively permit the power source assembly 28 to drive the blade 30 and stop rotation of the blade 30. When in the position shown in FIG. 1, the blade brake lever 22 can prevent or stop rotation of the blade 30. When pivoted toward the U-shaped portion 48, the blade brake lever 22 can permit rotation of the blade 30.

The first control assembly 24 can be mounted on the handle 20 in any appropriate position and orientation on the handle 20 that can facilitate interaction with an operator of the lawnmower 10. In the exemplary embodiment of FIG. 1, the first control assembly 24 can be mounted on the upper portion of the right extension 44 of the handle 20. The first control assembly 24 can be configured to actuate one or more operational features of the lawnmower 10. In one exemplary embodiment, the first control assembly 24 can be configured to cooperate with the blade brake lever 22 in order to signal the electric motor 36 to rotate the blade 30.

Alternatively, or additionally, the first control assembly 24 can be electrically connected to the power source assembly 12. FIG. 6 schematically illustrates the first control assembly 24 in electrical communication the motor driver 40 of the power source assembly 12. In this exemplary embodiment, first control assembly 24 can include a switch configured to selectively place the power source assembly 12 in an "ON" state in which the motor driver 40 is electrically connected to the battery 38 or in an "OFF" state in which the motor driver 40 is electrically disconnected from the battery 38.

The second control assembly 26 can be mounted on the handle 20 in any appropriate position and orientation on the handle 20 that can facilitate interaction with an operator of the electric lawnmower 10. In the exemplary embodiment of FIG. 1, the second control assembly 26 can be mounted on the U-shaped portion 48 of the handle 20. In an exemplary embodiment, the second control assembly 26 can include a switch or knob that is electrically connected to the power source assembly 12 and configured to adjust the rotational speed of the electric motor 36 of the power source assembly 12. The second control assembly 26 can include the switch configured to selectively place the power source assembly 12 in the "ON" state or in an "OFF" state (Instead of having this feature in the first control assembly 24). Alternatively, or additionally, the second control assembly 26 can include a switch or knob configured to selectively electrically (or mechanically) connect a self-propulsion assembly to the power source assembly 12. The self-propulsion assembly can include an electric drive motor that can apply torque to one or both of the rear wheels 18. The second control system 26 can be configured to adjust the speed at which the self-propulsion assembly propels the lawnmower 10 along the ground.

The collection bag 28 can be in communication with the cutting chamber 32 to collect vegetation that is cut by the blade 30. The collection bag 28 can be connected to the deck 14 at a side of the electric lawnmower 10 or at the rear of the lawnmower 10. In the exemplary embodiment of FIG. 1, the collection bag 28 is connected to the deck 14 at the rear of the lawnmower 10. The collection bag 28 can be removably mounted to the deck 4 in order to empty the cut vegetation from the collection bag 28. Alternatively, the lawnmower 10 can be operated without the collection bag 28.

The electric motor 36 can be a direct current motor or an alternating current motor. Referring to the schematic illustration of FIG. 2, the electric motor 36 can be a direct current outer rotor motor that includes an inner stator 50 and an outer rotor 52. Referring to FIG. 4, the motor 36 can further include a mounting base 54. The inner stator 50 can be supported by and fixed against rotation to the deck 14 and/or a fixed portion of the housing 42 and/or the mounting base 54. The outer rotor 52 can be supported to rotate relative to the inner stator 50 and the mounting base 54. The mounting base 54 can be mounted on a top surface 58 of the deck 14 and connected to the deck 14 in any appropriate manner such as but not limited to mechanical fasteners. For example, the mounting base 54 can include a plurality of mounting holes 56 spaced around the circumference of the mounting base 54. The mounting holes 56 can include internal threads configured to engage external threads of a bolt that passes through a corresponding hole passing extending from the cutting chamber 32 and through the top surface 58 of the deck 12.

The electric motor 36 an include one or more sensors that can provide the motor driver 40 with information regarding the temperature, rotational speed, power output, etc., of the electric motor 36.

The battery pack 38 can be configured to supply electricity to the electric motor 36. In some embodiments, the battery pack 38 can be selectively removed from the housing 42 and placed in a charger assembly that is separate from the electric lawnmower 10.

Referring to the schematic illustration of FIG. 2, the battery pack 38 can include at least one battery cell 60 and a case 62 that houses the at least one battery cell 60. The battery cell 60 can be a rechargeable battery such as but not limited a lithium ion battery or a nickel-metal hydride battery. The case 62 can include at least one air inlet 64 in a top wall 66 and at least one air outlet 68 in a bottom wall 70. The case 62 can be made from any appropriate electrically insulating material such as but not limited to electrically insulating plastics, ceramics, or insulated metal.

The battery pack 38 can include one or more sensors and electronic control units in electrical communication with the motor driver and each of the battery cells 60. The sensors and/or the electronic control unit can provide the motor driver with information regarding the temperature and remaining charge of the battery pack 38.

The motor driver 40 can be configured to regulate the supply of electricity from the battery pack 38 to the electric motor 36. When electricity from the battery pack 38 energizes the electric motor 36, the electric motor 36 can rotate the driveshaft 34, which rotates the blade 30 in the cutting chamber 32.

The motor driver 40 can be configured to monitor the operational conditions of the electric motor 36 and the battery 38. The motor driver 40 can be configured to control the voltage or current output by the battery 38 based on the operational conditions of the motor 36 and the battery pack 38.

The motor driver 40 can also be configured to amplify the voltage or current output by the battery 38, and to supply the amplified voltage or current to the electric motor 36 based on one or more inputs to the control assemblies 24, 26 by the operator of the electric lawnmower 10. Further, the motor driver 40 can be configured to supply the amplified voltage or current to the electric motor 36 based on one or more operational parameters of the electric motor and/or the battery pack 38.

Referring the schematic illustration of FIG. 5, the motor driver 40 can be in electrical communication with each of the first control assembly 24, the second control assembly 26, the electric motor 36 and the battery pack 38. The motor driver 40 can include a controller 72, an amplifier 74 and a heat sink 76.

The controller 52 can be in electrical communication with the first control assembly 24, the second control assembly 26, the electric motor 36, the battery pack 38 and the amplifier 74. The controller 72 can be referred to as an electronic control unit ("ECU") or as a central processing unit ("CPU") or as a microcontroller. The controller 72 can be configured with hardware, with or without software, to perform the assigned task(s). The controller 72 can include or be electrically connected to any appropriate memory device that can store and retrieve programs and/or data for use by the controller. The controller 72 can be configured to signal the amplifier 74 to initiate, adjust or terminate supply of voltage or current from the battery pack 38 to the electric motor 36 based on inputs received from the control assemblies 22, 24, the battery pack 38 and the motor 36.

The amplifier 74 can be any appropriate electrical device or electronic circuit that can increase the voltage or the current supplied by the battery 38 and transmit the amplified voltage or current to the electric motor 36. The controller 72 can be configured to signal the amplifier 74 to amplify the voltage or current based on any appropriate parameter(s) such as but not limited to state of charge of the battery cell(s) 60, state of health of the battery cell(s) 60, battery temperature, motor temperature, and operator requested motor speed.

The controller 72 and the amplifier 74 can generate heat during operation of the electric lawnmower 10. The heat sink 76 can be thermally coupled to each of the controller 72 and the amplifier such that the heat sink absorbs at least some of the heat generated by the controller 72 and the amplifier 74. The heat sink 76 can be configured to transfer at least some of the heat absorbed from the controller 72 and the amplifier 74 to the ambient environment.

Referring to FIGS. 1, 3 and 4, the housing 42 can shield the electric motor 36, the battery pack 38 and the motor driver 40 from dust, debris and liquids. The housing 42 can be made from any appropriate material such as but mot limited to metal, plastic or a combination of metal and plastic. The housing 42 can include a main housing 78 and a battery cover 80.

The main housing 78 can include a front wall 82, a rear wall 84, a right side 86, a left side 88 and a bottom end 90. The battery cover 80 can be referred to as a top end of the housing 42.

The battery cover 80 can be movably or removably connected to the main body 78 so that the battery pack 38 can be installed or removed from the housing 42. Referring to FIG. 4, the housing 42 can further include a hinge 92 that pivotally connects the battery cover 80 to the main body 78. The hinge 92 can connect a front end of the battery cover 80 to a forward portion of the left side 88 and a forward portion of the right side 86 of the housing 42. The left side hinge 92 is obstructed from view in FIG. 4.

The battery cover 80 can be pivoted between a closed position and an opened position. FIG. 1 shows the battery cover 80 in the closed position and FIGS. 3 and 4 show the battery cover 80 in the opened position. The battery cover 80 can be secured in the closed position so that the main body 78 and the battery cover 80 enclose the battery pack 38. The battery cover 80 can be secured in the closed position by any appropriate structure such as but not limited to a snap fastener, a strap, a pin, a threaded fastener, a lock, etc.

Each of electric motor 36, the battery 38, the controller 72 and the amplifier 74 can generate heat during operation of the lawnmower 10. If the transfer rate of the heat that is generated is less than the rate at which heat is generated by the electric motor 36, the battery 38, the controller 72 and the amplifier 74, then some or all of the component can enter an overheat condition in which the desired performance of one or more of the electric motor 36, the battery 38 and the motor driver 40 can be adversely affected. For example, the motor driver 40 can include one or more electronic components that can be adversely affected by an increase in temperature. The operational efficiency of the electric motor 36 and/or the battery 38 can decrease as the respective motor temperature and the battery temperature increases.

The housing 42 can be configured to enclose the electric motor 36, the battery 38 and the motor driver 40 in order shield the electric motor 36, the battery 38 and the motor driver 40 from dust, debris and fluids. However, the housing 42 may limit the heat transfer rate between the ambient environment and each of the electric motor 36, the battery 38 and the motor driver 40 if a conductive heat transfer process is relied on because the conductive heat transfer rate provided by the housing 42 might not be sufficient to maintain the electric motor 36, the battery 38 and/or the motor driver 40 at or below a desired operating temperature.

In contrast, the power source assembly 12 can implement a forced cooling process (also referred to as a convective heat transfer process) that can advantageously increase the heat transfer rate between the ambient environment and each of the electric motor 36, the battery 38 and the motor driver 40. The power source assembly 12 can include a forced cooling system that can provide sufficient cooling of the electric motor 36, the battery pack 38 and the motor driver 40 such that the power available to drive the blade 30 can be enhanced. As will be described in further detail below, the housing 42 can be configured to provide one or more structure(s) of the forced cooling system. The forced cooling system can enhance cooling, reduce thermal degradation and improve power output and operational performance of the electric motor 36, the battery pack 38 and the motor driver 40. The forced cooling system can include a relative orientation of the each of the electric motor 36, the battery pack 38, and the motor driver 40 that enhances the convective heat transfer between the electric motor 36, the battery pack 38 and the motor driver 40 and the circulating air. This relative orientation can limit the pressure drop(s) experienced by the air as it flows through the housing 42 and can further enhance the power output from the electric motor 36 to the blade 30.

In order to circulate cooling air through the housing 42, the interior of the housing 42 can be exposed to ambient environment. Thus, the housing 42 can include a predetermined airflow path that limits the amount of dust, debris, and liquids from the ambient environment that can enter the housing 42 via the forced cooling system. This can improve the maintenance cycle for each of the electric motor 36, the battery pack 38 and the motor driver 40.

Referring to FIGS. 2-4 and 7-9 collectively, the power source assembly 12 can include a fan 94, at least one air inlet 96 and at least one air outlet 98. The fan 94 can be located inside the housing 42. The air inlet 96 and the air outlet 98 can be formed in the housing 42 such that a sufficient flow of ambient air can efficiently enter and exit the housing 42 while preventing entry of dust, debris and liquids.

The fan 94 can be driven by the electric motor 36 and can be mounted on and driven by the driveshaft 34. The fan 94 can circulate ambient air through the power source assembly 12 in order to extract the heat generated by the power source assembly 12 by convective heat transfer and discharge the transferred heat to the ambient environment at such a rate that the performance of one or more components of the power source assembly 12 can be maintained at a desired level.

The fan 94 can be configured in any appropriate manner such that the fan 94 provides a sufficient airflow rate through the housing 42 while limiting the power drawn from the electric motor 36 to drive the fan 94. Referring to FIG. 7, the fan 94 can be configured as a centrifugal fan 94 in which air enters along a central axis (that can coincide with blade axis BA) and exits the outer circumference of the fan 94. FIG. 7 shows a cross-section of a lower portion of the housing 42 that includes a fan chamber 100, a plurality of air outlets 98 and the fan 94.

The fan 94 can include a plurality of blades 102 and a lower plate 104. The lower plate 104 can be a flat annular plate. The fan 94 can further include an upper plate that is omitted from FIG. 7 in order to show the blades 102. The upper plate can be spaced apart from and identical to the lower plate. The blades 102 can be connected to and extend from each of the lower plate 104 and the upper plate.

The air inlet 96 can be an opening that is adjacent to the top surface of the deck 14. The air inlet 96 can be an opening in the housing 42 that faces toward and opposes the top surface 58 of the deck 14. As will be described in detail below, at least one of the electric motor 36 the battery pack 38 and the motor driver 40 can be located inside that housing 42 at a position that is spaced above the air inlet 96 in an upward direction U and positioned downstream from the air inlet 96. That is, the predetermined airflow path can include a portion that rises in the upward direction U away from the air inlet 96 and the top surface 58 of the deck 14. Thus, the forced cooling system can use gravity to prevent dust and liquid from entering the housing 42, or at least limit the intrusion of dust and liquid into the housing 42 to an acceptably low flow rate. FIGS. 2-4 and 8 show a single air inlet 96, and FIG. 9 shows an alternate embodiment of the power source assembly 12 that can include a pair of air inlets 96, 144. However, the housing 42 can include any appropriate number of air inlets 96 in order to achieve the desire airflow through the housing 42.

The fan chamber 100 can be cylindrical in shape. The air outlets 98 can be spaced apart about the circumference of the fan chamber 100. The air outlets 98 can be in fluid communication with the fan chamber 100. Some exemplary embodiments can include three the air outlets 98 that are equally spaced apart about the circumference of the fan chamber 100. However, any appropriate number and spacing of the air outlets 98 can be utilized to obtain the desire airflow through the housing 42.

The housing 42 can be configured to route the air along a predetermined path such that air passing through housing 42 can efficiently cool each of the electric motor 36, the battery pack 38 and the motor driver 40 and also control pressure drop(s) through the housing 42 to limit the load on the fan 94. For example, the predetermined path can take advantage of the temperature and pressure gradients presented by each of the electric motor 36, the battery pack 38 and the motor driver 40 and such that the air flowing through each of the electric motor 36, the battery pack 38 and the motor driver 40 has a flow rate and heat absorbing capacity sufficient to transfer heat from each of the electric motor 36, the battery pack 38 and the motor driver 40 while also presenting a load to the fan 94 that does not adversely impact the power available from the electric motor 36 for driving the blade 30.

Referring to FIGS. 2, 6, 8 and 9, the housing 42 can include a driver chamber 106, a battery chamber 108 and a motor chamber 110. The electric motor 36, the battery pack 38 and the motor driver 40 are omitted from FIG. 6 to more clearly illustrate the features of the forced cooling system provided by the housing 42. The electric motor 36, the battery pack 38 and the motor driver 40 are schematically illustrated in each of FIGS. 2, 8 and 9 for simplicity of the drawings. The chambers 106, 108, 110 can be arranged according to the predetermined airflow path in order to limit the pressure drop through and between each of the chambers 106, 108, 110 and to enhance cooling efficiency for each of the electric motor 36, the battery pack 38 and the motor driver 40.

The driver chamber 106 can be located between the air inlet 96 and the battery chamber 108. The driver chamber 106 can be in fluid communication with the air inlet 96 and the battery chamber 108. The driver chamber 106 can extend alongside each of the motor chamber 110 and the battery chamber 108 and be spaced away from the top surface 58 of the deck 14.

The battery chamber 108 can be located between the driver chamber 106 and the motor chamber 110. The battery chamber 108 can be in fluid communication with the motor chamber 110.

The motor chamber 110 can be located between the battery chamber 108 and the top surface 58 of the deck 14. The motor chamber 110 can be located between the battery chamber 108 and the fan chamber 100. The motor chamber 110 can be in fluid communication with the fan chamber 100.

Referring to FIG. 2, when the fan 94 operates, air can enter the air inlet 96. Then the air can flow through the driver chamber 106 away from the top surface 58 of the deck 14 along the upward direction U as indicted by arrow A1. Then the air can pass through the motor driver 40 along the upward direction U as indicated by arrow A1. Air exiting the driver chamber 106 can flow along a leftward direction L and pass into the battery chamber 108 as indicated by arrow A2. Air flowing in the battery chamber 108 can flow through the battery pack 38 along a downward direction D that is toward the top surface 58 of the deck 14 as indicated by arrow A3. Air exiting the battery chamber 108 can pass into the motor chamber 110 as indicated by arrow A3. Air in the motor chamber 110 can flow through the electric motor 36 along the downward direction D as indicated by the arrow A3 in FIG. 2. Air that exits the motor chamber 110 can pass into the fan chamber 100 and flow through at least one of the air outlets 98 in the left direction L, the right direction R, the forward direction F or the rearward direction R. In the schematic illustration, the air can exit the air outlet in the leftward direction L as indicated by arrow A4. Referring to FIG. 7, air can exit each of the three exemplary air outlets in a first direction indicated by arrow A19 that extends along both the forward direction F and the rightward direction, in a second direction indicated by arrow A20 that extends along the rearward direction RR, and in a third direction indicated by arrow A21 that extends along both the leftward direction L and the forward direction F.

The schematic illustration of FIG. 2 shows that the fan 94 and the housing 42 can be configured to provide a method for cooling electrical components of the electric lawnmower 10. The method can include causing air to enter the housing 42 at a location that is adjacent to a top surface 58 of the deck 14; directing the air entering the housing 42 to flow through the driver chamber 106 that is spaced away from the top surface 58 of the deck 14 along the upward direction U such that the air in the driver chamber 106 flows along or through the motor driver 40 along the upward direction U; directing air exiting the driver chamber 106 to flow through a battery chamber 108 such that the air in the battery chamber 108 flows along or through the battery pack 38 toward the top surface 58 of the deck 14 in the downward direction D; directing air exiting the battery pack 38 to flow through the motor chamber 110 such that air in the motor chamber 110 flows along or through the electric motor 36 in the downward direction D; and directing air after passing the electric motor 36 to exit the housing 42.

Referring to FIGS. 3 and 6, the housing 42 can include a polygonal main body 162 and a cylindrical base 164 connected to the main body 162. The base 164 can be configured to be mounted on the top surface 58 of the deck 14. The main body 162 can include the driver chamber 106, the battery chamber 108 and the motor chamber 110. The main body 162 can also include the at least one air inlet 96. The fan chamber 100 can be located in the base 164. Referring to FIGS. 3, 4, 6 and 7, the base 164 can include the air outlets 98.

FIG. 10 is a schematic view of a lower portion of the power source assembly 12. Each of the air inlet(s) 96 can be spaced away from the top surface 58 of the deck 14 by a first distance D1 measured parallel to the blade axis BA. Each of the air outlets 98 can be spaced above the top surface 58 of the deck 14 by a second distance D2 measured parallel to the blade axis BA, and the second distance D2 can be less than the first distance D1.

Referring to FIGS. 3 and 6, the sides 86, 88 of the housing 42 can include a pair of inner walls 112, 114 and a pair of outer walls 116, 118. The inner walls 112, 114 can extend from and be connected to each of the front wall 82 and the rear wall 84.

The right inner wall 114 can extend along the driver chamber 106 and can be a first wall of the driver chamber 106. The right outer wall 118 can extend along and be opposed to the right inner wall 114. A portion the right outer wall 118 can be spaced away from the right inner wall 114. The driver chamber 106 can extend from the right inner wall 114 to the right outer wall 118. The air inlet 96 can extend between the right inner wall 114 and the right outer wall 118.

Referring to FIG. 6, the housing 42 can include pair of shelves 166, 168. The shelves 166, 168 can support the motor driver 40 in the driver chamber 106. The motor driver 40 can be secured to one or both of the shelves 166, 168 in any appropriate manner. The shelves 166, 168 can include a grille, perforations or other opening(s) that can permit air to pass through the shelves 166, 168. The structure of the shelves that can permit air to flow through the shelves 166, 168 is omitted from FIG. 6 for simplicity and clarity of the drawing.

The left outer wall 116 can extend along the right inner wall 112. A portion the right outer wall 116 can be spaced away from the right inner wall 112. The space 122 between the left inner and outer walls 112, 114 can be sealed such that air does not flow through the space and into the battery chamber 108, as shown in FIG. 8. In an alternate embodiment of FIG. 9, the space 122 can be configured to permit air to flow through the space 122 and into the battery chamber 108.

Referring to FIG. 6, the right inner wall 114 can include a first opening 124. The first opening 124 can be located in the housing 42 at a position that is downstream from the motor driver 40.

An air filter 126 can be mounted in the first opening 124. The air filter 126 can collect dust and debris that is entrained in the air flowing in the driver chamber 106. The filter 126 also can be configured to collect predetermined type(s) of liquids and/or a predetermined volume of liquid.

Referring to FIGS. 6, 8 and 9, the housing 42 can include a right intermediate chamber 128 located between the driver chamber 106 and the battery chamber 108. The right intermediate chamber 128 can be in fluid communication with the first opening in the right inner wall 114.

The housing 42 can include a right second wall 130 at one end of the right intermediate chamber 128. The right second wall 130 can include a plurality of second openings 132 in fluid communication with the battery chamber 108.

Referring to FIG. 6, the housing 42 can include a pair of chamber side walls 134, 136 and a bottom chamber wall 138. The chamber walls 134, 136, 138 can define a battery tray 140. The right chamber side wall 136 can extend along the right inner wall 114. The right intermediate chamber 126 can extend from the right chamber side wall 136 to the right inner wall 114. The right second wall 130 can extend from the right inner wall 114 to the right chamber side wall 136. The battery tray 140 and the battery cover 80 can define the battery chamber 108.

Referring to FIGS. 3 and 4, the battery chamber 108 can include a front end, a rear end and a battery chamber outlet 142. The front end of the battery chamber 108 can extend along an inner surface of the front wall 82 of the housing 42. The rear end of the battery chamber 108 can extend along the rear wall 144 of the battery cover 80. The battery chamber outlet 142 can be located adjacent to rear end of the battery chamber 108.

The housing 42 can include a single air inlet 96 along the right side 86 of the housing 42 that extends along the lower edge 146 of the right outer wall 86, as shown in FIG. 8. In an alternate embodiment shown in FIG. 9, the housing 42 can include a pair of air inlets 96, 144. The left air inlet 144 can face the top surface 58 of the deck 14. The left air inlet 144 can extend between the left inner wall 112 and the left outer wall 116. The left air inlet 144 can extend along the lower edge 148 of the left outer wall 116 and can be located on the left side 88 of the housing 42 that is opposite to the right side 86 on which the right air inlet 96 is located.

Referring to FIG. 6, the housing 42 can include a ceiling 150 and a third motor chamber inlet 152 in the ceiling 150. The motor chamber inlet 152 can be in fluid communication with the battery chamber outlet 142. The motor chamber inlet 152 can be in fluid communication with the motor chamber 110.

FIG. 8 schematically depicts the air flowing through the housing 42 that includes the single air inlet 96. When the fan 94 operates, air can enter the air inlet 96. Then the air can flow through the driver chamber 106 away from the top surface 58 of the deck 14 along the upward direction U as indicted by arrow A5. Then the air can pass through the motor driver 40 along the upward direction U as indicated by arrow A5. Air exiting the driver chamber 106 can flow along the leftward direction L and pass through the first opening 124 and the air filter 126 as indicated by arrow A6. Air exiting the air filter 124 can pass into the right intermediate chamber 128 as indicated by the arrow A6. Air flowing in the intermediate chamber 128 can flow along the upward direction U toward the second openings 132 in the right second wall 130 as indicated by arrow A7. Air exiting the second openings 132 can flow in the leftward direction L and into the battery chamber 108 as indicated by arrow A8. Air flowing in the battery chamber 108 can flow through the battery pack 38 along a downward direction D that is toward the top surface 58 of the deck 14 as indicated by arrow A9. Air exiting the battery chamber outlet can pass into the motor chamber inlet 152. The motor chamber inlet 152 can be wider than the battery chamber outlet 142 in the leftward/rightward directions L,R such that the air exiting the battery chamber outlet 142 can flow along the leftward direction L and the rightward direction R as indicated by the double-headed arrow A10. Air passing through the motor chamber inlet 152 can pass into the motor chamber 110 as indicated by arrows A11, A12. Air in the motor chamber 110 can flow through the electric motor 36 along the downward direction D as indicated by the arrow A11, A12. This schematic illustration is intended to indicate that the air can flow through the coils of the inner stator, which can be located along the path of the arrows A11, A12. Air that exits the motor chamber 110 can pass into the fan chamber 100 and flow through at least one of the air outlets 98 in the left direction L, the right direction R, the forward direction F or the rearward direction R. The air can exit one of air outlets 98 in one direction and another one of the air outlets in a different direction. FIG. 8 schematically shows the air exiting the fan housing 100 in the rightward direction R, as indicated by arrow A13 and in the leftward direction L, as indicated by arrow A14 because FIG. 8 does not show all of the air outlets. Referring to FIG. 7, air can exit each of the three exemplary air outlets in first direction D1 that extends along a combination of the forward direction F and the rightward direction R, in a second direction D2 that extends along the rearward direction RR, and in a third direction D3 that extends along a combination of the leftward direction L and the forward direction F.

FIG. 9 schematically depicts the air flowing through the housing 42 that includes the pair of air inlets 96, 144. The flow of air through the right inlet 96 through the housing 42 and out any one of the openings 98 can occur as described above with respect to FIG. 8. Additionally, when the fan 94 is operated, air can enter the housing 42 via the left air inlet 144. Then the air can flow through space 122 away from the top surface 58 of the deck 14 along the upward direction U as indicted by arrow A15. Air flowing through the space 122 can flow along the rightward direction R and pass through a left air filter 154 as indicated by arrow A16. Air exiting the left air filter 154 can pass into a left intermediate chamber 156 as indicated by the arrow A17. Air flowing in the left intermediate chamber 156 can flow along the upward direction U toward a plurality of third openings 158 in a left second wall 160 as indicated by arrow A17. Air exiting the third openings 158 can flow in the rightward direction R and into the battery chamber 108 as indicated by arrow A18. The air flowing into the battery chamber 108 from the left inlet 144 can join the air flowing into the battery chamber from the right inlet 96 and can pass through the battery chamber 108, the motor chamber 110, the fan chamber 100 and exit the housing through any one of the air outlets 98 as described above with respect to FIG. 8.

The left air inlet 144 can introduce air into the battery chamber 108 that does not pass through the motor driver 40. That is, the air entering the battery chamber 108 from the left air inlet 144 can be cooler than the air entering the battery chamber 108 from the right air inlet 96. Thus, the air passing through the battery pack can have a higher heat transfer capacity as compared to the airflow schematically depicted in FIG. 8.

As described above, the battery chamber 108 can be positioned adjacent to the motor chamber 110 such that air exiting the battery chamber 108 can enter the motor chamber 110 without flowing over or through other electrical/electronic structures of the power source assembly that can disrupt or otherwise adversely affect the flow rate and/or the pressure of the air flowing in the housing 42. For example, the space between the battery pack 38 and the electric motor 36 can be a set or predetermined value that can reduce the effects of wake in the air flow or can prevent a wake from developing in the space. Such a wake can cause a drop in air pressure in this space. This drop in pressure can reduce the flow rate of air in the space, which in turn, can reduce the cooling efficiency for the air with respect to the electric motor 36. Thus, the power source assembly 12 can include a cooling system that provides an advantageous amount of cooling with an advantageously low amount of power that is drawn from the electric motor 40 to operate the fan 94.

As described above, the housing 42 can be configured to provide an efficient packaging of the electric motor 36, the battery pack 38 and the motor driver 40. This efficient packaging can also be conducive to a cooling system that can efficiently transfer heat from each of the electric motor 36, the battery pack 38 and the motor driver 40 and exhaust the transferred heat to the ambient environment such that an advantageously low amount of power is drawn from the electric motor 40 to operate the fan 94.

As described above, the housing 42 can be configured with at least one air inlet that is spaced above the top surface 58 of the deck 14 and faces the top surface 58 of the deck 14 such that dust, debris and liquids must overcome the force of gravity in order to enter the housing 42. Further, the housing can include at least one air filter that is configured to collect dust, debris, and optionally, liquids. Thus, the power source assembly 12 can include a cooling system that advantageously cools the electric motor 36, the battery [pack 38 and the motor driver 40 and also is advantageously water proof and dust proof.

While certain embodiments of the invention are described above, it should be understood that the invention can be embodied and configured in many different ways without departing from the spirit and scope of the invention.

For example, alternative embodiments can include a battery pack 38 that can be permanently amounted in the housing 42. The power source assembly 12 can include a charging port that is in electrical communication directly with the battery pack 38 or indirectly via the controller 72. The charging port can be configured to receive a connector from an external power supply in order to recharge the battery cell 60.

Alternative embodiments can include a battery pack in which each battery cell 60 can be charged wirelessly. For example, the battery pack 38, or any appropriate structure of the electric lawnmower 10, can include an inductive coil that is in electrical communication with the battery cell(s) 60 directly or via the controller 72. When the inductive coil is aligned with a charger inductive coil that is in electrical communication with a external power supply, the inductive coil can receive electromagnetic energy from the charger inductive coil.

Electrical communication lines (not numbered) can connect the controller 72 to the first control assembly 24, the second control assembly 26, the electric motor 36, the battery pack 38 and the amplifier 74 and in any appropriate manner. Electrical communication can be either one-way communication or two-way communication and can be networked or not networked.

The battery pack 38 can include any appropriate number of battery cells 60 to achieve the desired output rating. The battery cells 60 can be connected in series in order to provide a desired voltage or current output. Alternatively, the battery pack 38 can include a plurality cell groups where each cell group includes a plurality of battery cells 60 connected in series and the cell groups are connected to each other in parallel order to provide a desired voltage or current output. Further, the battery pack could be eliminated and power can be provided by a typical extension cord/wire connectable to a power outlet.

The deck 14 can be made from any appropriate material such as but not limited to steel, iron, ceramics, plastic or any combination thereof. The deck 14 can be formed by stamping sheet metal into the desired shape. Alternately, the deck 14 can be molded into the desired shape. The deck 14 can be a single homogenous unit, or the deck 14 can be formed from a plurality of part that are connected together into the desired shape by any appropriate structure or method such as but not limited to mechanical fasteners, adhesives and welding.

The blades 102 can be aligned with a radial direction of the lower plate 102. Alternatively, the blades 102 can be tilted with respect to the radial direction of the lower plate 102. In some embodiments, the fan 94 can rotate clockwise as viewed in FIG. 7, and the blades 102 can be tilted in the rotational direction of the fan 94. However, exemplary embodiments can include the blades 102 titled opposite to the rotational direction of the fan 94.

The fan 94 can be integrated with the outer rotor 50 of the electric motor 36. However, alternate embodiments can include the fan 94 as a separate component from the electric motor 36 and either separately powered or powered by a transmission connected to motor 36. Alternate embodiments can include a fan 94 that has its own motor and is spaced away from the electric motor 36 and the driveshaft 34.

While the subject matter has been described in detail with reference to exemplary embodiments thereof, it will be apparent to one skilled in the art that various changes can be made, and equivalents employed, without departing from the scope of the invention.

What is claimed is:

1. A cooling system for a power source assembly for a lawnmower having a deck defining a cutting chamber and a blade mounted in the cutting chamber to rotate about a blade axis, the power source assembly includes a motor mounted on a top surface of the deck and is configured to rotate the blade in the cutting chamber, a battery pack, and a motor driver in electrical communication with each of the motor and the battery pack, the motor driver configured to convert power from the battery pack into output power supplied to the motor; the cooling system comprising:
    a housing configured to contain the motor, the battery assembly, and the controller, the housing includes,
        a bottom end configured to be mounted on the top surface of the deck,
        a top end configured to be spaced away from the top surface of the deck along an upward direction,
        at least one air inlet located adjacent to the top surface of the deck,
        a driver chamber in fluid communication with the air inlet and configured to support the motor driver,
        a battery chamber in fluid communication with the driver chamber and configured to support the battery pack,
        a motor chamber in fluid communication with the battery chamber and configured to contain the motor therein, and
        at least one air outlet in fluid communication with the motor chamber; and
    a fan mounted in the housing such that, when the fan operates, air enters the air inlet, then the air flows through the driver chamber away from the top surface of the deck along the upward direction, then the air passes through the motor driver along the upward direction, then the air passes into the battery chamber and flows through the battery pack along a downward direction that is toward the top surface of the deck, then the air passes into the motor chamber and flows through the electric motor along the downward direction, and the air that exits the motor chamber passes through the at least one air outlet.

2. The cooling system according to claim 1, wherein the at least one air inlet faces the top surface of the deck.

3. The cooling system according to claim 1, wherein
    the motor chamber is located between the top surface of the deck and the battery chamber, and
    the driver chamber extends along each of the motor chamber and the battery chamber.

4. The cooling system according to claim 1, wherein the motor is located in the housing at a position that is between the battery chamber and the fan such that air flowing through the driver chamber, the battery chamber and the motor chamber exits the motor chamber before entering the fan.

5. The cooling system according to claim 1, wherein the housing further includes:
    a front wall
    a rear wall;
    a pair of side walls extending from and connected to each of the front wall and the rear wall;
    a battery tray located between the side walls; and
    a battery cover pivotally connected to each of the side walls.

6. The cooling system according to claim 5, wherein the battery tray and the battery cover define the battery chamber.

7. The cooling system according to claim 1, wherein the driver chamber includes a first wall, a first opening in the first wall, and an air filter mounted in the first opening.

8. The cooling system according to claim 7, wherein the housing further includes:
    an intermediate chamber located between the driver chamber and the battery chamber, the intermediate chamber is in fluid communication with the first opening in the first wall; and
    a second wall at one end of the intermediate chamber, the second wall includes a plurality of second openings in fluid communication with the battery chamber.

9. The cooling system according to claim 7, wherein the first opening is downstream from the motor driver.

10. The cooling system according to claim 1, wherein the housing further includes an inner wall and an outer wall opposed to and extending along the inner wall, the air inlet extends between the inner wall and the outer wall, and the air inlet faces the top surface of the deck.

11. The cooling system according to claim 10, wherein the driver chamber extends between the inner wall and the outer wall.

12. The cooling system according to claim 10, wherein the housing includes a pair of air inlets and a plurality of air outlets, the air inlets are located on opposite sides of the housing, and the air outlets are equally spaced about a circumference of the housing.

13. The cooling system according to claim 1, wherein
    the battery chamber includes a front end, a rear end, a bottom wall, and a battery chamber outlet in the floor and located adjacent to the rear end, and
    air passing through the battery chamber exits the battery chamber via the battery chamber outlet.

14. The cooling system according to claim 1, wherein the upward direction is parallel to the blade axis.

15. The cooling system according to claim 1, wherein each of the driver chamber the battery chamber and the motor chamber are configured such that air passes consecutively through each of the driver chamber the battery chamber and the motor chamber in order.

16. A lawnmower comprising:
a deck including a top surface and a cutting chamber;
a plurality of wheels rotatably supported on the deck;
a drive shaft passing through the top surface of the deck and into the cutting chamber;
a blade located in the cutting chamber and connected to the drive shaft;
a motor mounted on a top surface of the deck and connected to the drive shaft,
the motor configured to rotate the blade in the cutting chamber;
a battery pack;
a motor driver in electrical communication with each of the motor and the battery pack, the motor driver configured to convert power from the battery pack into output power, and to supply the output power to the motor;
a housing configured to contain the motor, the battery pack and the motor driver, the housing includes,
a bottom end adjacent the top surface of the deck,
a top end spaced away from the top surface of the deck along an upward direction,
at least one air inlet located adjacent to the top surface of the deck,
a driver chamber in fluid communication with the air inlet, the motor driver located in the driver chamber,
a battery chamber in fluid communication with the controller chamber, the battery pack located in the battery chamber,
a motor chamber in fluid communication with the battery chamber, the motor located in the motor chamber, and
at least one air outlet in fluid communication with the motor chamber; and
a fan mounted in the housing and configured such that during operation air enters the air inlet, then the air flows through the driver chamber away from the top surface of the deck along the upward direction, then the air passes through the motor driver along the upward direction, then the air passes into the battery chamber and flows through the battery pack along a downward direction that is toward the top surface of the deck, then the air passes into the motor chamber and flows through the electric motor along the downward direction, and then the air exits the motor chamber passing through the at least one air outlet.

17. The lawnmower according to claim 16, wherein
the housing further includes a polygonal main body, and
a cylindrical base connected to and extending between each of the polygonal main body and the top surface of the deck,
the polygonal main body includes the driver chamber, the battery chamber and the motor chamber, and
the fan is mounted in the cylindrical base.

18. The lawnmower according to claim 17, wherein
the polygonal main body includes a pair of inner walls, a pair of outer walls, a pair of air inlets, and
the cylindrical base includes a plurality of air outlets,
each of the outer walls opposes and extends along a respective one of the inner walls,
each of the air inlets extends between a respective one of the inner walls and a respective one the outer walls, the air inlets face the cylindrical base, and
the air outlets are equally and circumferentially spaced about the cylindrical base.

19. The lawnmower according to claim 18, wherein the air inlets are spaced away from the top surface of the deck by a first distance measured parallel to the blade axis and the air outlets are spaced above the top surface of the deck by a second distance measured parallel to the blade axis, and the second distance is less than the first distance.

20. A method for cooling electrical components of a lawnmower that includes a deck, a blade rotatably mounted in a cutting chamber of the deck, a motor, a battery pack, a motor driver in electrical communication with the motor and the battery pack, and a housing that contains the motor driver, the battery pack, and the motor, where the motor driver is configured to convert power from the battery pack into output power and to supply the output power to the motor, the method comprising:
causing air to enter the housing at a location that is adjacent to a top surface of the deck;
directing the air entering the housing to flow through a driver chamber in the housing that is spaced away from the top surface of the deck along an upward direction such that the air in the driver chamber flows through the motor driver along the upward direction;
directing air exiting the driver chamber to flow through a battery chamber in the housing such that the air in the battery chamber flows through the battery pack toward the top surface of the deck in a downward direction;
directing air exiting the battery chamber to flow through a motor chamber in the housing such that air in the motor chamber flows through the motor in the downward direction; and
directing air exiting the motor chamber to exit the housing.

* * * * *